United States Patent [19]

Levy

[11] Patent Number: 4,510,301

[45] Date of Patent: Apr. 9, 1985

[54] FLUOROCARBON COPOLYMER FILMS

[75] Inventor: Stanley B. Levy, Wilmington, Del.

[73] Assignee: E. I. Du Pont de Nemours and Company, Wilmington, Del.

[21] Appl. No.: 485,821

[22] Filed: Apr. 25, 1983

Related U.S. Application Data

[63] Continuation-in-part of Ser. No. 383,454, Jun. 1, 1982, abandoned.

[51] Int. Cl.$^3$ .............................................. C08F 10/02
[52] U.S. Cl. ................................ 526/254; 526/249; 526/255; 526/247
[58] Field of Search ............... 526/247, 249, 254, 255

[56] References Cited

U.S. PATENT DOCUMENTS

| | | | |
|---|---|---|---|
| Re. 27,028 | 1/1971 | Ely, Jr. et al. ................ | 138/118 |
| Re. 28,628 | 11/1975 | Carlson et al. ................ | 204/159.2 |
| 2,435,537 | 2/1948 | Ford et al. .................... | 260/92.5 |
| 2,776,465 | 1/1957 | Smith ............................ | 28/82 |
| 2,792,377 | 5/1957 | Miller .......................... | 260/33.8 |
| 3,196,194 | 7/1965 | Ely, Jr. et al. ................ | 264/95 |
| 3,197,538 | 7/1965 | Capron et al. ................ | 264/288 |
| 3,265,092 | 8/1966 | Ely, Jr. et al. ................ | 138/118 |
| 3,417,176 | 12/1968 | Anderson et al. ............. | 264/230 |
| 3,426,118 | 2/1969 | Chapman et al. ............. | 264/230 |
| 3,426,119 | 2/1969 | Chapman et al. ............. | 264/230 |
| 3,499,185 | 3/1970 | Schmidt et al. ............... | 18/1 |
| 3,500,870 | 3/1970 | Ely, Jr. et al. ................ | 138/177 |
| 3,624,250 | 11/1971 | Carlson ......................... | 260/80.75 |
| 3,659,000 | 4/1972 | Cronk ........................... | 156/229 |
| 3,677,845 | 7/1972 | Roberts ......................... | 156/3 |
| 3,707,592 | 12/1972 | Ishii et al. ..................... | 264/210 |
| 3,770,711 | 11/1973 | Hartig et al. .................. | 260/87.5 |
| 3,786,127 | 1/1974 | Peet et al. ..................... | 264/288 |
| 3,796,784 | 3/1974 | Rest et al. ..................... | 264/288 |
| 3,869,534 | 3/1975 | Yoshikawa et al. ............ | 264/210 |
| 3,878,274 | 4/1975 | Murayama et al. ............ | 264/2 |
| 3,925,339 | 12/1975 | Ishii et al. ..................... | 260/92.1 |
| 3,941,546 | 3/1976 | Hartig .......................... | 425/387 |
| 3,991,451 | 11/1976 | Maruyama et al. ............ | 29/25.42 |
| 4,064,214 | 12/1977 | FitzGerald .................... | 264/147 |
| 4,094,949 | 6/1978 | Yokokawa et al. ............ | 264/234 |
| 4,151,245 | 4/1979 | Suzuki .......................... | 264/288 |
| 4,241,128 | 12/1980 | Wang ............................ | 428/212 |
| 4,248,924 | 2/1981 | Okita ............................ | 428/212 |
| 4,250,605 | 2/1981 | Chapman ...................... | 29/132 |
| 4,268,653 | 5/1981 | Uchidoi et al. ................ | 526/255 |
| 4,277,429 | 7/1981 | Okita ............................ | 264/127 |
| 4,290,983 | 9/1981 | Sasaki et al. .................. | 264/22 |
| 4,302,556 | 11/1981 | Endo et al. .................... | 525/199 |
| 4,308,370 | 12/1981 | Fukada et al. ................. | 526/255 |
| 4,325,998 | 4/1982 | Chapman ...................... | 428/36 |

FOREIGN PATENT DOCUMENTS

| | | |
|---|---|---|
| 80023578 | 6/1980 | Japan . |
| 8036493 | 9/1980 | Japan . |
| 1069690 | 5/1967 | United Kingdom . |
| 1136866 | 12/1968 | United Kingdom . |
| 1173688 | 12/1969 | United Kingdom . |
| 1471397 | 4/1977 | United Kingdom . |
| 2065140A | 11/1979 | United Kingdom . |

OTHER PUBLICATIONS

"Tetrafluoroethylene Copolymers with Ethylene", Encyclopedia of Polymer Science and Technology, Supplement 1, Copyright 1976, John Wiley and Sons Publishers.

Research Disclosure, Product Licensing Index, Aug. 1972.

Structure and Properties of Oriented Polymers, Chapter 12, pp. 413-423, (1975).

Primary Examiner—Paul R. Michl
Assistant Examiner—Alex H. Walker

[57] ABSTRACT

A film of a fluorocarbon copolymer of ethylene, and tetrafluoroethylene or chlorotrifluoroethylene, which upon heat shrinking in the longitudinal direction, does not expand in the transverse direction.

20 Claims, 2 Drawing Figures

FLUOROCARBON COPOLYMER FILMS

CROSS-REFERENCE TO RELATED APPLICATIONS

This application is a continuation-in-part of application Ser. No. 383,454, filed June 1, 1982, abandoned.

BACKGROUND OF THE INVENTION

The subject invention relates to films of fluorocarbon copolymers of ethylene copolymerized with tetrafluoroethylene or chlorotrifluoroethylene, and optionally other comonomers, and a process for their preparation.

Ethylene/tetrafluoroethylene copolymers of a mole ratio of about 1:1 are potentially useful in many applications because of their outstanding chemical and electrical resistance properties. Unfortunately, their tensile properties, and specifically their low modulus of elasticity (the films are too soft) and F5 value, i.e., the stress required to stretch the film 5 percent at a selected temperature, prevents the copolymer films from being economically converted into products by conventional high-speed machinery. Also, unfortunately, these copolymer films do not resist creep well enough over long periods of time to carry moderate loads without excessive deformation. Furthermore, while the copolymers have high melting points (of about 270° C.), the tensile properties of these copolymer films are relatively low to begin with and decline further at temperatures well below the melting point.

Copolymers of ethylene/chlorotrifluoroethylene are disclosed in U.S. Pat. No. 2,392,378 to Hanford, but such copolymers melt at 240° C. or below. A procedure for preparing somewhat higher melting copolymers of these monomers is disclosed in European Polymers Journal, Vol. 3, pages 129–144 (1967), but even these higher melting copolymers cannot be used in high temperature applications since they suffer from the same disadvantage as the ethylene/tetrafluoroethylene copolymers. Films of these copolymers, copolymerized with an adjuvant amount of a third comonomer, are disclosed in U.S. Pat. No. 3,624,250, and can be irradiated as in U.S. Pat. No. Re. 28,628, both to Carlson, however, no mention is made of the benefits achieved when films of those copolymers are uniaxially stretched.

SUMMARY OF THE INVENTION

In accordance with the subject invention, a film of a fluorocarbon copolymer is provided, which film, upon heating, shrinks when shrinkage is measured in one direction and does not expand in a direction perpendicular to that of first direction.

Further, the creep rate is lowered in both directions and the film exhibits improved high temperature mechanical properties over as-cast films. These properties are unexpected.

In a preferred embodiment, the subject invention is a film of a melt-fabricable fluorocarbon copolymer which contains 40 to 60 mole percent units derived from ethylene copolymerized with tetrafluoroethylene or chlorotrifluoroethylene and, optionally, a minor amount of at least one copolymerizable monomer, said film after one-way stretching having shrinkage of 0 to 10 percent in the direction perpendicular to the direction of stretching (hereinafter called "transverse" direction), and shrinkage of at least 5 percent in the direction of stretching (hereinafter called "longitudinal" direction), when heated for 2 minutes at about 200° C.

Also provided is a process for the production of these films, as well as a process by which these films are heat set.

Also provided are thermally dimensionally stable films.

DETAILED DESCRIPTION

Figure 1:
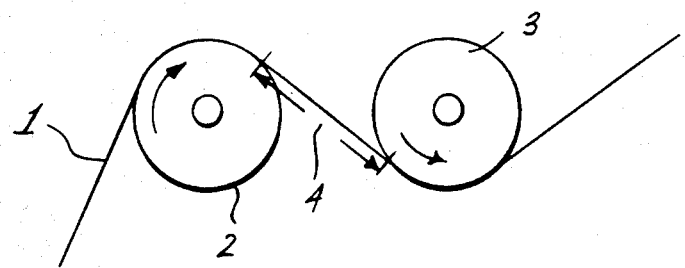
FIG. 1 illustrates one stretching assembly useful in the practice of the subject invention.

The melt fabricable fluorocarbon copolymers useful in the practice of the subject invention include those formed by copolymerization of ethylene with tetrafluoroethylene or chlorotrifluoroethylene and, optionally, a minor amount of at least one other copolymerizable monomer.

The copolymer of ethylene and tetrafluoroethylene is disclosed in U.S. Pat. No. 2,468,664 to Hanford and Roland. These copolymers can be prepared by the nonaqueous polymerization of U.S. Pat. No. 3,528,954 to Carlson which discloses bringing the two monomers together in a nontelogenic chlorofluorocarbon solvent, at a temperature from 30° to 85° C. and in the presence of polymerization initiator active at such temperature and thereafter recovering the copolymer.

The copolymer of ethylene and chlorotrifluoroethylene is disclosed in U.S. Pat. No. 2,392,378 to Hanford and is preferably prepared in a nonaqueous polymerization system.

With respect to the copolymers of this invention, from 40 to 60 mole percent of ethylene is ordinarily present and, preferably, complementary to total 100 mole percent, from 40 to 60 mole percent of tetrafluoroethylene or chlorotrifluoroethylene is present. When either more or less tetrafluoroethylene or chlorotrifluoroethylene is present, the tensile properties of the copolymer may become undesirably low. Description of the composition of the copolymers herein in terms of monomer content is intended to refer to the units making up the copolymer derived by copolymerization of the monomers. Generally, both the tetrafluoroethylene-containing copolymers and the chlorotrifluoroethylene-containing copolymers are composed essentially of ethylene units alternating with either tetrafluoroethylene or chlorotrifluoroethylene units on a 1:1 basis. Of course, copolymers containing ethylene as well as both tetrafluoroethylene and chlorotrifluoroethylene units, are contemplated by this invention.

In order to be melt fabricable, these copolymers should be of film forming melt viscosities, generally having specific melt viscosities of no greater than about $5 \times 10^6$ poises ($5 \times 10^5$ Pa·s) measured at a shear stress of 0.455 kg/cm² (0.045 MPa), at 300° C. for the tetrafluoroethylene copolymers and at 260° C. for the chlorotrifluoroethylene copolymers. These copolymers also have second order transition temperatures of between 75° and 95° C. and crystalline melt temperatures of between 240° and 280° C. (both measured using conventional differential thermal analysis).

Minor amounts of one or more copolymerizable monomers may be present in the copolymers useful in the practice of the subject invention. By "copolymerizable" is meant that the monomer is able to form an integral part of the main copolymer chain and must not act as an inhibitor to prevent the copolymerization reaction from occurring. Ordinarily these copolymerizable monomers are vinyl monomers which are free of telogenic activity, i.e., they must not act as a chain transfer agent to an extent which undesirably limits the molecular weight of the copolymer. These monomers may also include other compounds that will copolymerize such as halogenated ketones, e.g. those of the formula $$X-CF_2-\overset{\overset{O}{\|}}{C}-CF_2-X'$$

wherein X and X' are selected from the group consisting (1), individually, of hydrogen, fluorine, chlorine and bromine, and perfluoroalkyl, ω-hydro-, ω-chloro-, ω-bromo, and ω-alkoxyperfluoroalkyl of up to 18 carbons and (2), jointly, of haloperfluoroalkylene of 1-3 carbons.

These additional monomers include those having no more than one carbon atom in a side chain such as hexafluoropropylene, isobutylene and perfluoro(methyl vinyl ether), as well as the vinyl monomers having a substituent containing at least two carbon atoms. Examples of this latter group are the fluorinated vinyl monomers represented by the formulas $$R-CF=CF_2 \text{ and } ROCF=CF_2$$

wherein R is an organic group which can be cyclic, acyclic and/or contain an aromatic nucleus and which contains from 2 to 8 carbon atoms. Generally, the organic group will be highly fluorinated, i.e., at least one fluorine atom substituted on each carbon atom. However, other atoms can be present such as chlorine as monosubstituents on a carbon atom. Hydrogen can also be present in the groups in a position where it is essentially inert, such as the omega position as part of the group of $-CF_2H$ or as part of the group $-CH_3$. Similarly, other atoms such as S and N can be present in an inert moiety.

Fluorinated-alkyl ethylenes can be employed as the optional minor component. They generally have the formula $R_f-CH=CH_2$ where $R_f$ is perfluoroalkyl of 1-10 carbons or α-substituted perfluoroalkyl.

Representative fluorinated vinyl monomers that can be used include the fluorinated α-olefins such as perfluorobutene-1, perfluoropentene-1, perfluoroheptene-1, omegahydroperfluorooctene-1 and perfluorobutyl ethylene, and the fluorinated vinyl ethers represented by the formula $XCF_2(CF_2)_nOCF=CF_2$ wherein X is F, H or CL and n is an integer of 1 to 7. Examples of such vinyl ethers include perfluoro(ethyl vinyl ether), perfluoro(propyl vinyl ether), and 3-hydroperfluoro(propyl vinyl ether). Another fluorinated vinyl ether that can be used is perfluoro(2-methylene-4-methyl-1,3-dioxolane) which is described in U.S. Pat. No. 3,308,107 to Selman and Squire.

The organic (R) group need not be highly fluorinated where some sacrifice in thermal stability of the resulting copolymer can be tolerated. Examples of monomers not highly fluorinated and useful in the present invention include the hydrofluorocarbon fluorinated vinyl monomers and hydrocarbon fluorinated vinyl monomers, such as of the formulas $CF_3(CF_2)_mCH_2OCF=CF_2$, where m is an integer of 0 to 6 and $CH_3(CH_2)_nOCF=CF_2$, where n is an integer of 1 to 7, respectively. These vinyl ethers are made by reacting the respective sodium alcoholate with tetrafluoroethylene under conditions disclosed in U.S. Pat. No. 3,159,609. Examples of these vinyl ethers include n-butyltrifluorovinyl ether and 2,2,3,3,3-pentafluoropropyl trifluorovinyl ether.

Examples of vinyl monomers in which the side chain is aromatic include perfluorostyrene, pentafluorostyrene, and α,β,β-trifluorostyrene.

Additional vinyl monomers in which the vinyl group is hydrocarbon and which are useful in the present invention can be represented by the formulae $$R^1CH_2\overset{\overset{X}{|}}{C}=CH_2 \text{ and } R^2OCH_2\overset{\overset{X}{|}}{C}=CH_2$$

wherein $R^1$ and $R^2$ are perfluorinated or chlorofluoroalkyl groups of 1 to 7 carbon atoms and X is H or $CH_3$. The simplest of these vinyl monomers are prepared by reacting hexafluoroacetone with propylene in the presence of $AlCl_3$ and hexafluoroacetone with allyl bromide in the presence of CsF, respectively. Further description of vinyl monomers of these formulae and process for making them is provided in Knunyants, Bull. Acad. Sci., USSR, Div. Chem. Sci., 355 (1962) and Dutch Pat. No. 6,602,167. Typical $R^1$ and $R^2$ groups for these monomers include the perfluoroalkyls such as $CF_3CF_3CF_2-$, and $(CF_3)_2CF-$ and the chlorofluoroalkyls such as $(CClF_2)_2CF$. $R^1$ can also be a secondary or tertiary halo-alcohol such as of the group $-(CClF_2)_2COH$, or $-(CF_3)_2COH$, such as described in U.S. Pat. No. 3,444,148. Examples of these vinyl monomers are as follows: 4,4,4-trifluorobutene-1; 3,3,3-trifluoropropylene; 4,4,5,5,5-pentafluoropentene-1; 1,1,1-trifluoro-2-(trifluoromethyl)-4-penten-2-ol; 1-chloro, 1,1-difluoro-2-(chlorodifluoromethyl)-4-penten-2-ol; 1,1,1-trifluoro-2-(trifluoromethyl)-4-methyl-4-penten-2-ol; 4-(trifluoromethyl)-4,5,5,5-tetrafluoropentene-1; allyl heptafluoroisopropyl ether; allyl-1,3-dichloropentafluoroisopropyl ether; allyl heptafluoropropyl ether; allyl pentafluoroethyl ether and 2-methyl allyl heptafluoroisopropyl ether.

By "minor amount" of additional monomer is meant 0.1 to 10 mole %, preferably less than 3 mole %, of monomer based on total polymer. These monomers are generally randomly interspersed among the ethylene and the tetrafluoroethylene or chlorotrifluoroethylene units.

The formation of fluorocarbon copolymer films is well known in the art. Generally speaking, the polymer is extruded in melt form from an orifice and quenched to well below its melting point. The extrusion orifice can be such that the film produced is in flat sheet or tubular form. The film thickness will generally be between 0.5 and 100 mils before stretching and between 0.05 and 20 mils after stretching. If tubular film is to be stretched in accordance with the subject invention, the tube may first be collapsed and laid flat, or be slit and opened into flat sheet form.

The films that are subjected to the stretching procedures described herein are substantially unstretched films. In other words the films are "as-cast" films which have low moduli and strength. Normally, these films have moduli of about 800-1600 MPa in each of two mutually perpendicular directions and exhibit a shrinkage of about ±2.0 percent in each such direction when heated at 180° C. (a negative shrinkage represents expansion).

The process of the subject invention can best be described by reference to the Figures. In FIG. 1, fluorocarbon film 1 is transported into contact with and partially around roll 2, into contact with and partially around roll 3, and under tension to some conventional wind-up means. Rolls 2 and 3 are aligned parallel with each other and, to effectuate uniaxial stretching of film 1 in stretch zone 4, the peripheral drive speed of roll 2 is slower than that of roll 3, the difference in peripheral drive speeds being such that the film is stretched to about 4 to 10 times the length of the unstretched film. Of course, multiple rolls may also be used to effectuate this stretching.

To prevent slippage of film 1 on rolls 2 or 3, the film is contacted with the rolls under pressure as, for example, by the partial wrapping of the film around rolls 2 and 3 as seen in FIG. 1. Alternatively, conventional nip rolls may be used to force film 1 onto either or both rolls.

The film must be heated to a temperature at least about 40° C. above, and no greater than about 100° C. above, the second order transition temperature of the polymer in order to accomplish the desired stretching. Preferably, this stretching temperature is between 145° and 175° C. The film need be at stretch temperature when it enters stretch zone 4. The heating can be accomplished by, e.g., heating roll 2 or by housing the stretching apparatus depicted in FIG. 1 in an oven.

To exhibit the shrinkage characteristics in the film as a result of stretching, the film must be held under tension until cooled to below the second order transition temperature of the polymer. This is accomplished by conventional cooling means applied between roll 3 and the wind-up means or, alternatively roll 3 may act as a cooling means. As is common with stretched film, the very edges of the film are of non-uniform gauge relative to the remainder of the film. These edges, or "beads", are generally trimmed prior to packaging the wound film.

Figure 2:
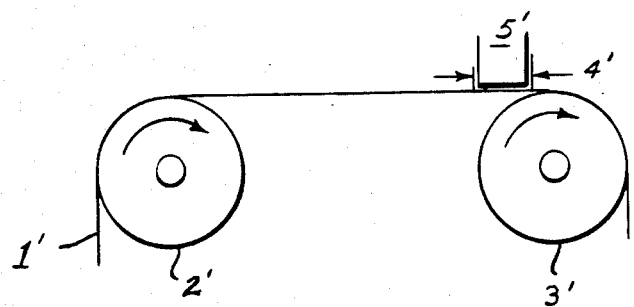
FIG. 2 illustrates another stretching assembly useful in the practice of the subject invention.

In FIG. 2, illustrating an alternative stretching assembly for use in the process of the subject invention, fluorocarbon film 1' is transported into contact with and over roll 2', into contact with and over roll 3', and under tension to some conventional wind-up means. Again, rolls 2' and 3' are aligned parallel with each other and, to effectuate uniaxial stretching of film 1' in stretch zone 4', the peripheral drive speed of roll 2' is slower than that of roll 3'. In this assembly, the film is heated for stretching by radiant heater 5'.

A critical aspect of the subject invention is the ratio of the width of the film to be stretched to the length of the stretch zone, the stretch zone being defined as the length of film which is allowed to stretch at any given instant, as illustrated in the Figures as the length of film in stretch zones 4 and 4'. If this ratio is too small, the loss of film width resulting from longitudinal stretching, or neck-in, is too great relative to the film's total width. The result of too small a ratio, as seen below, is a film which, when re-heated, shrinks in the direction of stretching but expands in the direction perpendicular to stretching. Therefore, for purposes of the subject invention, the ratio of film width to stretch zone length need be greater than about 5.5, preferably greater than about 10. Of course, if a partial wrap-around stretching apparatus, as illustrated in FIG. 1, is to be used, the distance between the two rolls need be greater than the thickness of the film in order for the film to pass between the rolls.

Another critical aspect of the subject invention is the degree of uniaxial stretching. Fluorocarbon copolymer film stretched less than about 4 times its original length tends to expand upon heating in the direction perpendicular to stretching. When an attempt is made to stretch fluorocarbon copolymer film greater than about 8 times its unstretched length, the film will break at some point.

Surprisingly, film produced in accordance with the process detailed above exhibits transverse shrinkage of 0 to 5 percent, (and preferably 0 to 10 percent), and longitudinal shrinkage of at least 5 percent, preferably 10 to 25 percent, when heated for 2 minutes at 200° C. Of course, these conditions are used for convenience and it will be evident to those skilled in the art that the films of the subject invention tend to shrink at temperatures comparable to the temperatures at which they were stretched, the amount of shrinkage increasing with increase of temperature or with increasing time at test temperature.

The test for determining the amount of shrinkage in a non heat set film is as follows:

Six 10 cm×2.5 cm samples are cut from the material, three along the direction of stretch and three perpendicular to it. They are placed in an oven at 200° C. for a period of two minutes with no restraint. After removal and air cooling, the samples are measured in their long dimension. The percent shrinkage is calculated for two directions, and the results averaged for each direction (a negative shrinkage represents expansion).

Further, the films of the subject invention are unique in their high longitudinal tensile properties. At 23° C., the longitudinal tensile modulus (ASTM D-882) of these films is greater than about 3500 MPa and can range upward to 7000 MPa; the longitudinal F5 value for these films, i.e., the stress required to stretch the film 5 percent, is greater than about 70 MPa and can range upward to 170 MPa; and the ultimate strength (ASTM D-882) of these films is greater than about 210 MPa and can range upward to 300 MPa. In addition, lower permeability to gases such as $O_2$, $H_2O$ vapor, $CO_2$ and $N_2$ has been observed.

Also, excessive creep rates have been detrimental to the performance of as cast fluorocarbon copolymer films. Although uniaxial stretching is expected to improve tensile creep resistance in the direction of stretching, a surprising result of the uniaxial stretching of the films of the subject invention after a stretch of more than 300 percent stretch, is a great increase in tensile creep resistance in the transverse direction (all creep measurements reported herein taken at room temperature). For example, the creep rate, will be no greater than 1/10th the rate of an as-cast film (measured by ASTM D-674 at 1000 hours under a load of 10 MPa).

The uniaxially stretched film produced in accordance with the procedure above can be heat set in any conventional manner to make dimensionally stable films. For example, the film can be run over a pair of rolls, the first heated to a heat set temperature from about 5° C. above the stretching temperature to about 5° C. below the crystalline melt temperature of the polymer, preferably 5° C. to 30° C. below the crystalline melt temperature of the polymer, the second, acting as a cooling roll, having a temperature substantially below the heat set temperature, preferably at least about 100° C. below the heat set temperature. The peripheral drive speeds of these rolls may be approximately equal to allow what is known in the art as stress relaxation or, alternatively, the second roll may be run at a speed slightly slower than the first to allow what is known as strain relaxation. The time of heat setting can be as little as 0.1 seconds depending on the temperature. On the other hand dwell time on the first roll can be about 2–5 seconds, if desired. The resulting heat set film is dimensionally stable, exhibiting transverse shrinkage of −1 to 2%, preferably 0 to 2%, and longitudinal shrinkage of 0 to 3%, when heated for thirty minutes at about 180° C.

The test for determining dimensional stability of a film is as follows:

Three 10 cm × 10 cm samples are cut from the material, one from the middle and one from near each edge. They are placed in an oven at the designated temperature for a period of 30 minutes with no restraint. After removal and air cooling, the samples are measured in both the LD and TD; five measurements at equally spaced intervals are made in each direction, at 1, 3, 5, 7 and 9 cm. For each sample a percentage dimensional change is calculated and the results averaged in each direction. When so tested, the heat set films are dimensionally stable and exhibit a transverse dimensional change of between −1 to +2%, preferably 0 to 2, and a longitudinal dimensional change of 0 to 3%, when heated for thirty minutes at 180° C. Surprisingly, the edge thickening, or "bead" effect evident after the uniaxial stretching detailed above is reduced, and in some cases eliminated, by the heat setting of the fluorocarbon copolymer films. This bead reduction is accompanied by an improved transverse gauge uniformity not generally evidenced with stretched, heat set film of the past.

The films of this invention exhibit good high temperature mechanical properties as compared to as-cast films. For example, the uniaxially stretched films and the heat-set films exhibit tensile moduli at 180° C. of at least about 5 times that of an as-cast film in both the transverse and longitudinal direction at the same temperature, also the F5 values at 180° C. of both the uniaxially stretched films and the heat-set films are at least about 2.5 times those of the as-cast films in both the transverse and longitudinal directions.

The lack of transverse expansion, and in most cases positive transverse shrinkage, of the films of the subject invention allows those films to be fit, e.g., around window casings, around cooking surfaces, over domed frames etc., and heat shrunk, thereby causing the film to draw taut. The high transverse tensile modulus allows the film to withstand conversion induced stresses, distortion and warpage, complementing the well known low friction, durable nature of these fluorocarbon copolymers. Finally, the two dimensional creep resistance of the films of the subject invention reduces the need for structural support for these films.

In general, the films of this invention are useful as carriers, electrical insulation, chemical barriers, thermal barriers, physical barriers, structural members, or as manufacturing aids, in the following applications: wire bundling; insulation for wires, membrane switches, motor slots, flat cables, flexible printed circuits, capacitors, strain gauges, under-carpet wiring, transformers, ultrahigh voltage cable, cable splicing tapes, etc.; electrets; tamper resistant seals for outdoor use such as for utility meters and other tamper resistant seals; mica replacement; microwave lens/window (ovens/radomes); tubing (spiral wound, laminated, sealed); gaskets; diaphragms; heat exchangers; chemical reactors; linings; ducting; expansion joints; bags; sight-glass coverings; pond liners; shrinkable covers; column packing, e.g. for distillation; de-mist devices; pillows (evaporation control); flange safety covers; spill-control bladders; protective clothing; rupture disks; antistick/corrosion resistant surfacing or covering; pumps; windows and glazing; lighting lenses; solar collectors (glazing/reflector/absorber); coated film base; skylights; architectural panels; reflective film (metallized and laminated); green houses; covers for photovoltaic cells; sewage treatment enclosures; protective laminations (i.e., documents, signs, decals, labels); release films; metallizing carrier belt; cooking/heating equipment (UV, IR, electromagnetic); deicing surfaces; roll covering; solar sails; drafting film; safety shields for light and heat sources (bulbs, flame, etc.); chemical service; pressure sensitive tape base; belting; closures (cap liners); magnetic recording film bases; punch tape bases; interior surfacing (protective and decorative); yarn (slit film); strapping; packaging (chemical, medical, sterilizable, etc.); roll leaf carrier; enclosures (gloved containment boxes, oxygen tents, etc.); office machines (ribbon shield, etc.); appliance printed control panel; roofing; cross-ply sheeting; air barrier curtain; oven liners.

The subject invention will be more fully appreciated with reference to the Examples that follow.

EXAMPLE I

Copolymer (a) below was melt extruded at 300° C. onto a 99° C. quench drum into 0.25 mm (10 mil) film and, along with films (b) and (c), were subsequently stretched at 150° C. by passing the film through a stretching apparatus as illustrated in FIG. 1. The peripheral drive speed of roll 2 was 3 m/min, of roll 3 increased gradually from 6 m/min to 25 m/min, and the temperature of both rolls was 150° C. The ratio of film width to stretch zone length was 17.

(a) Ethylene/51.5 mole % tetrafluoroethylene/1.75 mole % perfluoro(butyl ethylene) copolymer (E/TFE/PFBE) having a crystalline melting temperature of 270° C. and a specific melt viscosity of $10^5$ poises ($10^4$ Pa·s) at 297° C.;

(b) ethylene/chlorotrifluoroethylene copolymer (E/CTFE) (about 1:1 mole ratio) having a crystalline melting temperature of 245° C., and a specific melt viscosity of $2 \times 10^4$ poises ($2 \times 10^3$ Pa·s) at 275° C.; and (c) A film of ethylene/50 mole % tetrafluoroethylene/3–5 mole % hexafluoropropylene/0.2 mole % perfluoro (propyl vinyl ether) (E/TFE/HFP/PPVE) having a crystalline melting temperature of about 275° C.

The following results were obtained:

TABLE I

| % Stretch | Shrinkage at 200° C. % LD | % TD | Modulus[1] LD MPa | Ultimate[1] Strength (LD) MPa | F5[1] (LD) MPa | % Creep[2] 1000 hrs LD | TD |
|---|---|---|---|---|---|---|---|
| (a)[3] E/TFE/PFBE | | | | | | | |
| 0 | 0.7 | 0.5 | 1104 | 51.8 | 15.9 | 82 | 229 |
| 100 | 40.0 | −12.0 | 1346 | 93.8 | 24.2 | 9.0 | |
| 200 | 35.3 | −2.7 | 2139 | 129.7 | 40.7 | 4.2 | |
| 300 | 20.8 | 0 | 3381 | 213.9 | 69.7 | 1.9 | 7.6 |
| 400 | 14.7 | 0.5 | 4547 | 256.7 | 94.5 | 1.5 | 9.9 |
| 500 (550) | 12.7 | 1.3 | 5575 | 306.3 | 140.1 | 1.5 (1.4) | (8.6) |
| 600 | 12.0 | 1.5 | 6624 | 302.9 | 169.1 | 0.8 | |
| (b) E/CTFE | | | | | | | |

TABLE I-continued

|  | Shrinkage at 200° C. |  | Modulus[1] LD MPa | Ultimate[1] Strength (LD) MPa | F5[1] (LD) MPa | % Creep[2] 1000 hrs |  |
|---|---|---|---|---|---|---|---|
| % Stretch | % LD | % TD |  |  |  | LD | TD |
| 0 | 1.1 | 0.8 | 1525 | 71.1 | 30.4 | | |
| 100 | 33.8 | −11.7 | 1891 | 95.9 | 32.4 | | |
| 200 | 26.2 | −4.5 | 2546 | 142.1 | 42.8 | | |
| 300 | 15.2 | 1.5 | 3899 | 206.3 | 66.9 | | |
| 400 | 9.7 | 2.3 | 4982 | 279.5 | 92.5 | | |
| 500 | 8.7 | 2.7 | 5437 | 299.5 | 107.0 | | |
| 600 | 8.0 | 3.5 | 6624 | 314.6 | 153.2 | | |
| 700 | 8.2 | 2.5 | 6914 | 254.6 | 164.2 | | |
| (c) E/TFE/HFP/PPVE | | | | | | | |
| 0 | 1.3 | 0.05 | 1214 | 53.1 | 22.1 | | |
| 100 | 35.0 | −9.7 | 2042 | 75.9 | 31.7 | | |
| 200 | 27.0 | −1.3 | 3754 | 142.8 | 62.1 | | |
| 300 | 20.2 | 0.8 | 5472 | 231.2 | 112.5 | | |
| 400 | 13.8 | 1.5 | 6100 | 258.1 | 151.1 | | |

LD = longitudinal direction
TD = transverse direction
[1]ASTM D-882, reported in (MPa).
[2]ASTM D-674.
[3]This film, unstretched, exhibited $O_2$ permeability of 217 cm$^3$/100 in$^2$ · mil · 24 · hr, compared to 62 cm$^3$/100 · in$^2$ · mil · 24 hr for 400% stretched film.

COMPARATIVE EXAMPLE

E/TFE/PFBE copolymer film identical to that of Example I was stretched under the conditions of Example I except that the ratio of film width to stretch zone length was 0.9. Upon heating the film to 200° C. for 2 minutes, TD expansion was evidenced as indicated below:

TABLE II

| % Stretch | % LD Shrinkage | % TD Shrinkage |
|---|---|---|
| 0 | 0.7 | +0.5 |
| 100 | 41.7 | −25.2 |
| 200 | 39.7 | −12.3 |
| 300 | 24.0 | −3.3 |
| 400 | 16.7 | −1.5 |
| 500 | 15.3 | −1.0 |
| 600 | 10.7 | −1.0 |
| 700 | 10.6 | −0.5* |

*Film breaks at about 750% stretch.

EXAMPLE II

The 400% stretched E/TFE/PFBE film per Example I was heat set by passing the film over an apparatus similar to FIG. 1. The peripheral drive speed of both rolls was about 6 m/min, the temperature of the first roll set at 240° C., and that of the second roll set at 80° C. The resulting film exhibited small dimensional changes over a range of temperatures, as seen from the following data.

| Shrinkage temp (°C.) | % LD Shrinkage | % TD Shrinkage |
|---|---|---|
| 105 | 0.9 | 0.0 |
| 150 | 1.5 | 0.0 |
| 200 | 2.2 | −0.5 |

I claim:

1. A film of a melt fabricable fluorocarbon copolymer of 40 to 60 mole percent ethylene copolymerized with tetrafluoroethylene or chlorotrifluoroethylene, and optionally a minor amount of at least one other copolymerizable monomer; said film when heated for two minutes at 200° C. having a shrinkage of 0 to 10 percent in a first direction in the plane of the film, and a shrinkage of at least 5 percent in a second direction in the same plane as the first and which is perpendicular to the first direction.

2. The film of claim 1 having a transverse shrinkage of 0 to 5 percent and a longitudinal shrinkage of at least 5 percent, when heated for two minutes at 200° C.

3. The film of claim 2 having a longitudinal F5 value of at least 70 MPa.

4. The film of claim 1 or 2 wherein at least one said optional other copolymerizable monomer is present.

5. The film of claim 4 wherein said at least one other optional monomer includes a perfluoroalkyl ethylene.

6. The film of claim 4 wherein at least one other said optional monomer includes a halogenated ketone.

7. The film of claim 4 wherein at least one said optional monomer includes a perfluoroalkyl vinyl ether.

8. A dimensionally stable film comprising a film obtained by heating a film of claim 1 while under tension; said dimensionally stable film having transverse shrinkage of −1 to +2 percent, and longitudinal shrinkage of 0 to 3 percent, when heated for thirty minutes at 180° C.

9. The film of claim 8 wherein the transverse shrinkage is 0 to 2 percent.

10. The film of claim 8 or 9 wherein at least one said optional other copolymerizable monomer is present.

11. The film of claim 10 wherein said at least one optional other monomer includes perfluoroalkyl ethylene.

12. The film of claim 11 wherein at least one other said optional monomer includes a halogenated ketone.

13. The film of claim 11 wherein at least one said optional monomer includes a perfluoroalkyl vinyl ether.

14. A process for stretching a film of a melt fabricable fluorocarbon copolymer of 40 to 60 mole percent ethylene copolymerized with tetrafluoroethylene or chlorotrifluoroethylene, and optionally a minor amount of at least one other copolymerizable monomer; comprising:
providing a pair of adjacent and parallel rolls, one roll having a peripheral drive speed slower than that of the other;
contacting said film under pressure against the slower driven roll and heating said film so that, in a stretch zone where the ratio of film width to stretch zone length is at least about 5.5, the film is at a temperature at least about 40° C. above, and no greater than about 100° C. above, the second order transition temperature of the polymer;
feeding said film from said slow roll into contact with and under pressure against the faster driven roll, the difference in peripheral drive speeds between the two rolls being such that the film is stretched between the rolls to about 4 to 10 times the length of the unstretched film; and
holding the film under tension while cooling the film to below the second order transition temperature of the polymer.

15. The process of claim 14 wherein the ratio of film width to stretch zone length is at least 10.

16. The process of claim 14 wherein the film is subsequently heat set by heating the film while under tension.

17. The process of claim 14, 15 or 16 wherein at least one said optional other copolymerizable monomer is present.

18. The process of claim 17 wherein said at least one other optional monomer includes a perfluoroalkyl ethylene.

19. The process of claim 17 wherein said at least one other optional monomer includes a halogenated ketone.

20. The process of claim 17 wherein said at least one other optional monomer includes a perfluoroalkyl vinyl ether.

* * * * *